US012756144B2

(12) United States Patent
Chang et al.

(10) Patent No.: US 12,756,144 B2
(45) Date of Patent: Oct. 6, 2026

(54) ELECTRICAL CONNECTOR WITH A GROUNDING PIECE BETWEEN TERMINALS

(71) Applicant: Advanced Connectek Inc., New Taipei City (TW)

(72) Inventors: Ming-Yung Chang, New Taipei City (TW); Jian Bo Luo, New Taipei City (TW); Kuo Sheng Chang, New Taipei City (TW)

(73) Assignee: Advanced Connectek Inc., New Taipei City (TW)

( * ) Notice: Subject to any disclaimer, the term of this patent is extended or adjusted under 35 U.S.C. 154(b) by 642 days.

(21) Appl. No.: 17/986,908

(22) Filed: Nov. 15, 2022

(65) Prior Publication Data

US 2023/0155327 A1 May 18, 2023

(30) Foreign Application Priority Data

Nov. 16, 2021 (CN) ........................ 202111351922.3

(51) Int. Cl.
*H01R 13/6591* (2011.01)
*H01R 13/50* (2006.01)
(Continued)

(52) U.S. Cl.
CPC ....... *H01R 13/65914* (2020.08); *H01R 13/50* (2013.01); *H01R 13/6275* (2013.01); *H01R 13/639* (2013.01); *H01R 13/646* (2013.01); *H01R 13/6585* (2013.01); *H01R 13/6594* (2013.01); *H01R 24/60* (2013.01); *H01R 13/627* (2013.01); *H01R 13/648* (2013.01); *H01R 13/658* (2013.01); *H01R 13/6581* (2013.01); *H01R 13/6582* (2013.01);
(Continued)

(58) Field of Classification Search
CPC .............. H01R 13/65914; H01R 13/50; H01R 13/6275; H01R 13/639; H01R 13/646; H01R 13/6585; H01R 13/6594; H01R 24/60; H01R 13/627; H01R 13/648; H01R 13/658; H01R 13/6581; H01R 13/6582; H01R 13/6583; H01R 13/6591; H01R 13/65912; H01R 13/65917; H01R 2201/06
See application file for complete search history.

(56) References Cited

U.S. PATENT DOCUMENTS

2016/0149348 A1* 5/2016 Kao ....................... H01R 24/60
439/607.05
2016/0156136 A1* 6/2016 Kao .................. H01R 13/6585
439/607.05

* cited by examiner

*Primary Examiner* — Justin M Kratt
(74) *Attorney, Agent, or Firm* — JCIPRNET

(57) ABSTRACT

The disclosure provides an electrical connector, including a shell, an insulating body, a plurality of terminals, and a grounding piece. Another electrical connector is inserted into a insertion space of the shell along a insertion axis. The insulating body and the grounding piece are arranged on the shell. The terminals are arranged on the insulating body along an alignment axis. The grounding piece includes a fixed portion, two first connecting portions which extend from the fixed portion, two second connecting portions which extend from the fixed portion, two clamp arms respectively extending from the two first connecting portions, and two grounding legs respectively extending from the second connecting portions. The first connecting portions and the second connecting portions extend at opposite directions. The clamp arm and the grounding piece extend at opposite directions.

17 Claims, 6 Drawing Sheets

(51) Int. Cl.

| | |
|---|---|
| ***H01R 13/627*** | (2006.01) |
| ***H01R 13/639*** | (2006.01) |
| ***H01R 13/646*** | (2011.01) |
| ***H01R 13/6585*** | (2011.01) |
| ***H01R 13/6594*** | (2011.01) |
| ***H01R 24/60*** | (2011.01) |
| *H01R 13/648* | (2006.01) |
| *H01R 13/658* | (2011.01) |
| *H01R 13/6581* | (2011.01) |
| *H01R 13/6582* | (2011.01) |
| *H01R 13/6583* | (2011.01) |

(52) U.S. Cl.

CPC ...... *H01R 13/6583* (2013.01); *H01R 13/6591* (2013.01); *H01R 13/65912* (2020.08); *H01R 13/65917* (2020.08); *H01R 2201/06* (2013.01)

ELECTRICAL CONNECTOR WITH A GROUNDING PIECE BETWEEN TERMINALS

CROSS-REFERENCE TO RELATED APPLICATION

This application claims the priority benefit of China application serial no. 202111351922.3, filed on Nov. 16, 2021. The entirety of the above-mentioned patent application is hereby incorporated by reference herein and made a part of this specification.

BACKGROUND

Technical Field

The disclosure relates to an electrical connector.

Description of Related Art

With the development of science and technology, a variety of connectors for different electronic products have emerged. One of the most widely used and popular electrical connectors equipped on electronic devices is the USB connector. At present, the USB TYPE-C connector is widely used to realize positive and negative insertion. However, the length of the grounding piece of the current TYPE-C connector is long, leading to a corresponding increase in the length of the USB product, which in turn affects the high-frequency characteristics of the TYPE-C connector.

SUMMARY

The disclosure provides an electrical connector with excellent high-frequency characteristics.

The electrical connector according to an embodiment of the disclosure includes a shell, two insulating bodies, a plurality of terminals, and a grounding piece. The shell has an insertion space and comprises an inner shell and an outer shell. The inner shell comprises two inner shell components. Another electrical connector is adapted to be inserted into the insertion space along an insertion axis. The two insulating bodies are respectively arranged on both sides of the inner shell. The plurality of terminals are arranged on the two insulating bodies along an alignment axis. The grounding piece is sandwiched between the two inner shell components. The grounding piece includes a fixed portion, two first connecting portions, two second connecting portions, two clamp arms, and two grounding legs. The two first connecting portions respectively extend from the fixed portion. The two second connecting portions respectively extend from the fixed portion. Extending directions of the two first connecting portions are opposite to each other. Extending directions of the two second connecting portions are opposite to each other. The two clamp arms respectively extend from the two first connecting portions towards the insertion space. The two grounding legs respectively extend from the two second connecting portions. An extending direction of each of the two clamp arms and an extending direction of each of the two grounding legs are opposite to each other.

According to an embodiment, the plurality of terminals are located between the two clamp arms on the alignment axis. The two clamp arms respectively have clamp heads to clamp the another electrical connector.

According to an embodiment, the fixed portion, the two first connecting portions, and the two clamp arms are connected to one another to form a U-shaped structure. An opening of the U-shaped structure faces the insertion space.

According to an embodiment, the fixed portion, the two second connecting portions, and the two grounding legs are connected to one another to form an inverted U-shaped structure. An opening of the inverted U-shaped structure faces away from the insertion space.

According to an embodiment, a distance is maintained between each of the two first connecting portions and each of the two second connecting portions along the insertion axis.

According to an embodiment, the inner shell has the insertion space and covers the grounding piece. The outer shell covers the inner shell and the two insulating bodies, and the plurality of terminals. The inner shell has two first positioning protrusions. Each of the two first positioning protrusions protrudes into the distance to clamp each of the two first connecting portions and each of the two second connecting portions along the alignment axis.

According to an embodiment, the inner shell comprises the two inner shell components to form a closed annular structure and forms the insertion space. The grounding piece is assembled between the two inner shell components and the two grounding legs extend out of the inner shell. The two first positioning protrusions are located in at least one of the two inner shell components.

According to an embodiment, the two inner shell components further form two accommodating notches located on the alignment axis. The two clamp arms respectively extend into the insertion space from the two accommodating notches.

According to an embodiment, the inner shell further has two second positioning protrusions that are located in at least one of the two inner shell components. The fixed portion has two fixed holes corresponding to the two second positioning protrusions. The fixed portion of the grounding piece is assembled on the two second positioning protrusions through the two fixed holes and is positioned between the two inner shell components.

According to an embodiment, the two second positioning protrusions are located between the two first positioning protrusions along the alignment axis.

The electrical connector according to an embodiment of the disclosure includes a shell, two terminal modules, and a grounding piece. The shell has an insertion space and comprises an insulative housing and a metallic shell. Another electrical connector is adapted to be inserted into the insertion space along an insertion axis. The two terminal modules are respectively arranged on both sides of the insulative housing. The grounding piece is located inside the insulative housing. The grounding piece includes a fixed portion, two first connecting portions, two second connecting portions, two clamp arms, and two grounding legs. The two first connecting portions respectively extend from the fixed portion. Extending directions of the two first connecting portions are opposite to each other. The two second connecting portions respectively extend from the fixed portion. Extending directions of the two second connecting portions are opposite to each other. The two clamp arms respectively extend from the two first connecting portions towards the insertion space. The two grounding legs respectively extend from the two second connecting portions. An extending direction of each of the two clamp arms is opposite to an extending direction of each of the two grounding legs.

According to an embodiment, the insulative housing comprises two insulative housing components to form a closed annular structure and forms the insertion space and the grounding piece is sandwiched between the two insulative housing components.

According to an embodiment, the two insulative housing components are symmetrically arranged relative to the insertion axis.

According to an embodiment, each of the two terminal modules comprises an insulating body and a plurality of terminals arranged on the insulating body along an alignment axis, wherein the insulating body is arranged on the insulative housing.

According to an embodiment, along the alignment axis, the plurality of terminals are located between the two clamp arms, and the two clamp arms respectively have clamp heads to clamp the another electrical connector.

According to an embodiment, the fixed portion, the two first connecting portions, and the two clamp arms are connected to one another to form a U-shaped structure, and an opening of the U-shaped structure faces the insertion space.

According to an embodiment, the fixed portion, the two second connecting portions, and the two grounding legs are connected to one another to form an inverted U-shaped structure, and an opening of the inverted U-shaped structure faces away from the insertion space.

According to an embodiment, a distance is maintained between each of the two first connecting portions and each of the two second connecting portions along the insertion axis.

The electrical connector according to an embodiment of the disclosure includes a shell, a plurality of terminals, and a grounding piece. The shell has an insertion space and comprises an insulative housing and a metallic shell. Another electrical connector is adapted to be inserted into the insertion space along an insertion axis. The plurality of terminals is arranged on the insulative housing along an alignment axis. The grounding piece is located inside the insulative housing. The grounding piece includes a fixed portion, two first connecting portions, two second connecting portions, two clamp arms, and two grounding legs. The two first connecting portions respectively extend from the fixed portion. Extending directions of the two first connecting portions are opposite to each other. The two second connecting portions respectively extend from the fixed portion. Extending directions of the two second connecting portions are opposite to each other. The two clamp arms respectively extend from the two first connecting portions towards the insertion space. The two grounding legs respectively extend from the two second connecting portions. An extending direction of each of the two clamp arms is opposite to an extending direction of each of the two grounding legs.

According to an embodiment, the fixed portion, the two first connecting portions, and the two clamp arms are connected to one another to form a U-shaped structure. An opening of the U-shaped structure faces the insertion space. The fixed portion, the two second connecting portions, and the two grounding legs are connected to one another to form an inverted U-shaped structure. An opening of the inverted U-shaped structure faces away from the insertion space.

Based on the above, by means of the structural design of the grounding piece, the electrical connector of the disclosure is provided with the first connecting portions and the clamp arms extending therefrom, and the second connecting portions and the grounding legs extending therefrom, with the fixed portion as the structural reference, to shorten the length of the grounding piece along the insertion axis without affecting the clamping force of the grounding piece for another electrical connector (not shown), thereby controlling the length of the electrical connector along the insertion axis. Accordingly, compared with conventional electrical connectors in which the length of the electrical connector along the insertion axis is increased due to the structure of the grounding piece, which affects the high-frequency characteristics of the electrical connector, the electrical connector of the disclosure has excellent high-frequency characteristics.

In order to make the above-mentioned and other features and advantages of the disclosure clearer and easier to understand, the following embodiments are given and described in detail with accompanying drawings as follows.

DESCRIPTION OF THE EMBODIMENTS

Figure 1:
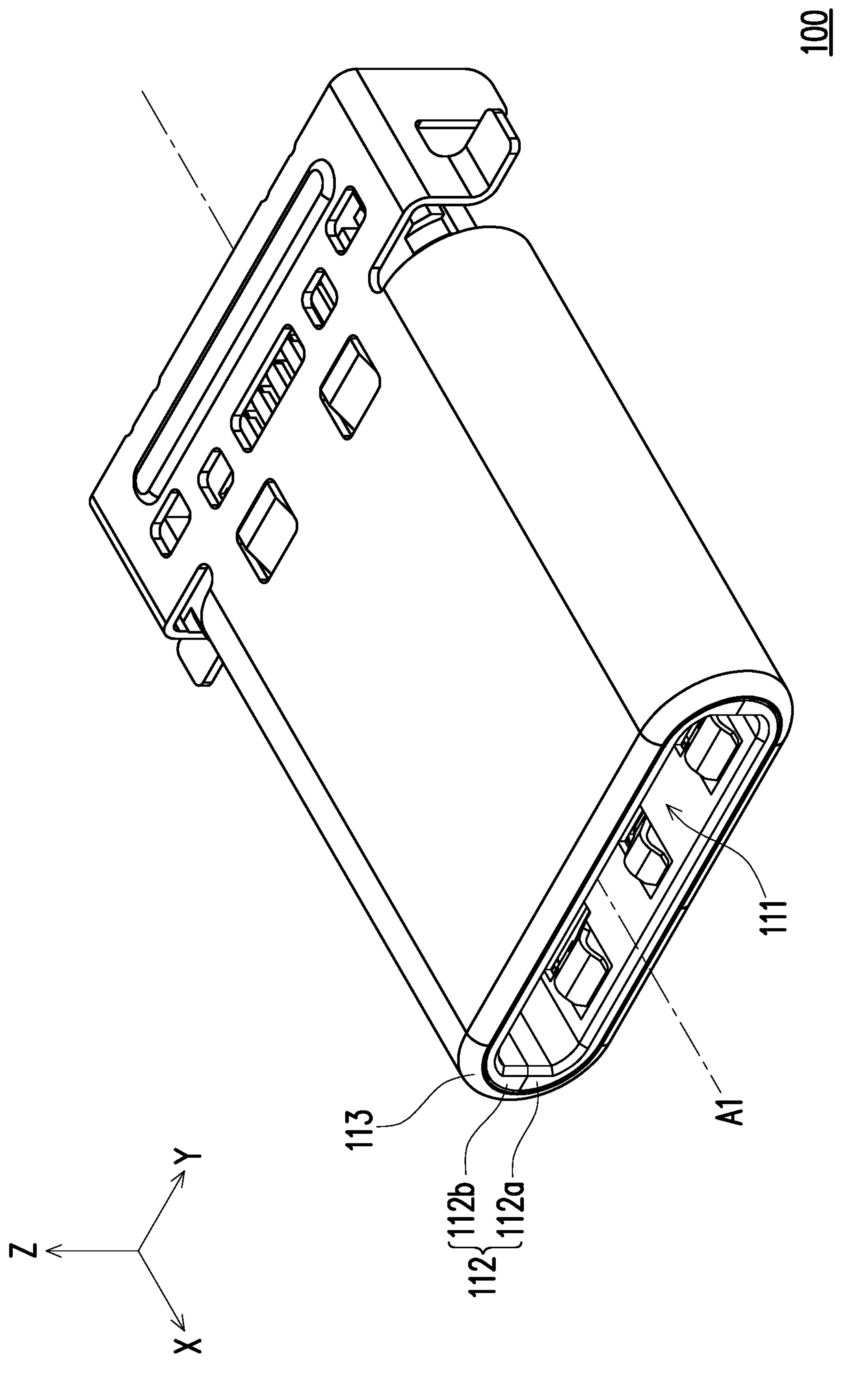
FIG. 1 is a schematic view of an electrical connector in accordance with an embodiment of the disclosure.

FIG. 1 is a schematic view of an electrical connector in accordance with an embodiment of the disclosure. At the same time, Cartesian coordinates X-Y-Z are provided to facilitate the related description and reference of components hereinafter. Referring to FIG. 1, the electrical connector 100 of this embodiment is, for example, a TYPE-C connector suitable for being applied to an USB, and for connecting with the other electrical connector (not shown) along an insertion axis A1 (equivalent to the X axis).

Figure 2:
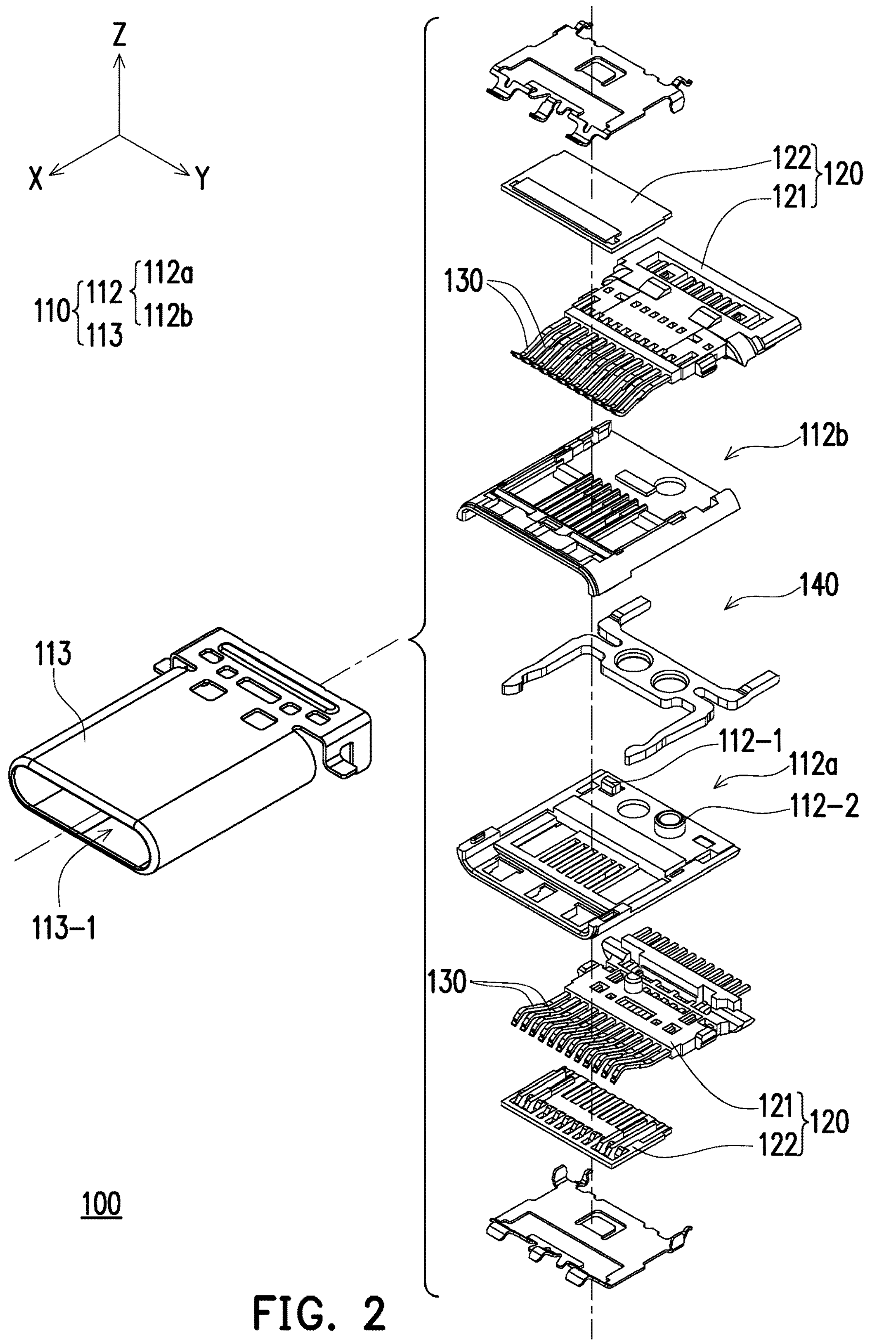
FIG. 2 is an exploded view of the electrical connector shown in FIG. 1.

FIG. 2 is an exploded view of the electrical connector shown in FIG. 1. Referring to FIG. 2, in this embodiment, the electrical connector 100 includes a shell 110, two insulating bodies 120, a plurality of terminals 130, and a grounding piece 140. The shell 110 includes an inner shell 112 and an outer shell 113. The inner shell 112 has an insertion space 111 (FIG. 1), and the other electrical connector is adapted to be inserted into the insertion space 111 of the inner shell 112 along the insertion axis A1. The outer shell 113 is a metallic shell and has an accommodating space 113-1 for accommodating the inner shell 112, the two insulating bodies 120, the terminals 130, and the grounding piece 140. The inner shell 112 is an insulative housing and is composed of two inner shell components **112*a* and 112*b* along the Z axis to form a closed annular structure and forms the insertion space 111, and the two inner shell components 112*a* and 112*b* are symmetrically arranged relative to the insertion axis A1. In other words, two inner shell components 112*a* and 112*b* are two insulative housing components. Essentially the grounding piece 140 is sandwiched between the two inner shell components 112*a* and 112*b*. The inner shell 112 covers the grounding piece 140, and the outer shell 113 covers the inner shell 112, the two insulating bodies 120, and the terminals 130**.

In detail, in this embodiment, the two insulating bodies 120 are respectively assembled in the two inner shell components **112*a* and 112*b* of the inner shell 112 along the Z axis, and are arranged symmetrically above and below relative to the insertion axis A1. The terminals 130 are arranged along the alignment axis A2 (equivalent to the Y axis), and the terminals 130 are respectively arranged on the two insulating bodies 120. The grounding piece 140 is assembled to be clamped between the two inner shell components 112***a* and 112*b* of the inner shell 112.

Specifically, in this embodiment, each insulating body 120 includes a first component 121 and a second component 122. The terminals 130 are divided into upper row terminals and lower row terminals. The upper row terminals and the lower row terminals are respectively combined with the corresponding first component 121 to from an upper terminal module and a lower terminal module, and portions of the terminals 130 that extend out of the first component 121 pass through the inner shell 112. The second component 122 extends along the X axis in succession from the structure of the first component 121 to shield the portions of the terminals 130 which extend out of the first component 121.

It should be noted that, in this embodiment, the first component 121 and the terminals 130 are combined by, for example but not limited to, the technique of insert molding. In this embodiment, the first component 121 and the second component 122 are two independent components that can be assembled separately, but in other embodiments, the first component 121 and the second component 122 can be integrated into one depending on the requirements of the manufacturing process.

FIG. 3 to FIG. 6 are schematic views of some components of the electrical connector of FIG. 1. It should be noted that, in order to clearly illustrate the structural relationship of the electrical connector 100, FIG. 3 only shows one of the inner shell components 112*a*, some of the terminals 130, and the grounding piece 140, and FIG. 4 only shows the other inner shell component 112*b*, the other terminals 130, and the grounding piece 140. In addition, the outer shell 113 is omitted in FIGS. 5 and 6.

Figure 3:
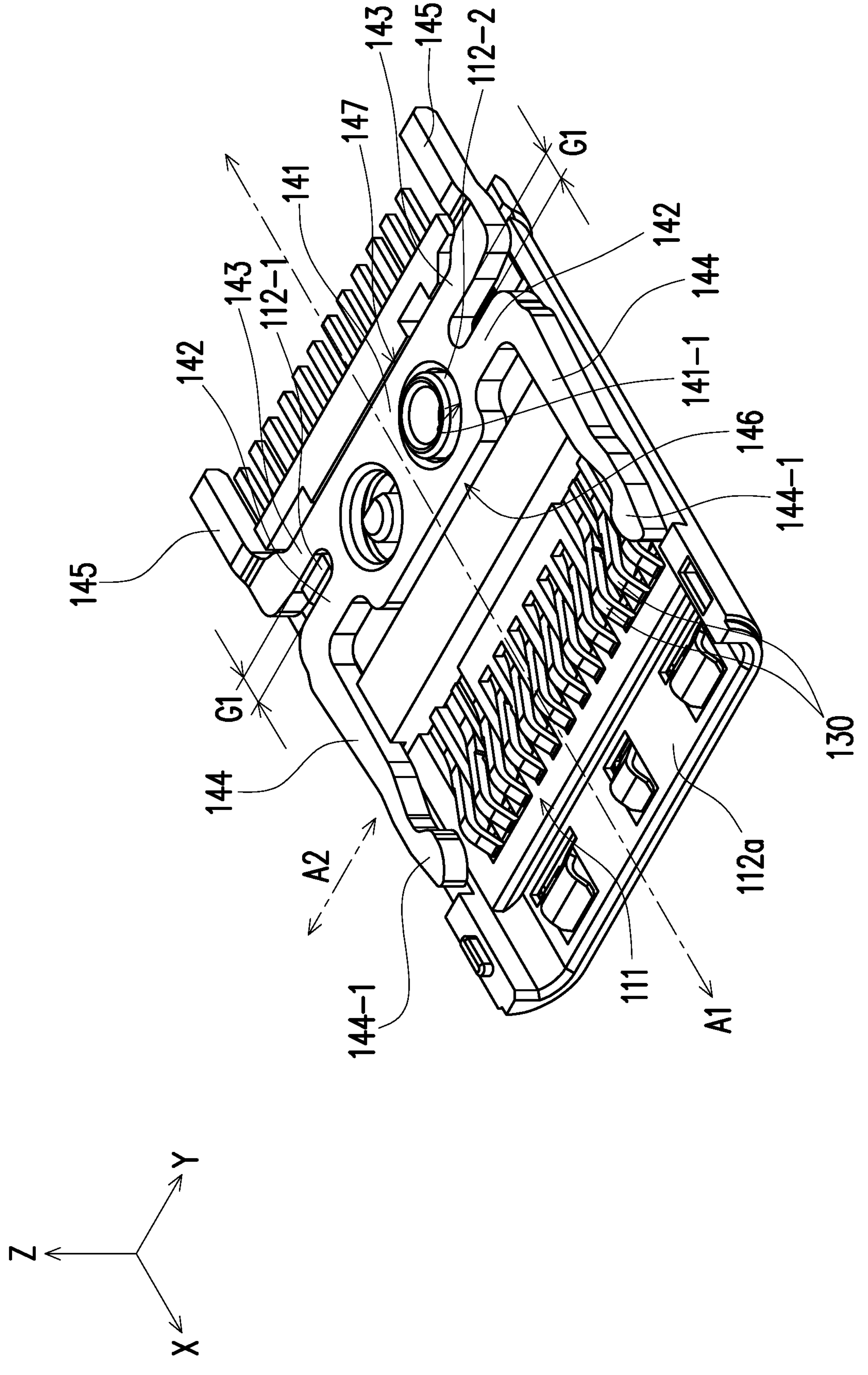
FIG. 3 to FIG. 6 are schematic views of some components of the electrical connector of FIG. 1.
Figure 4:
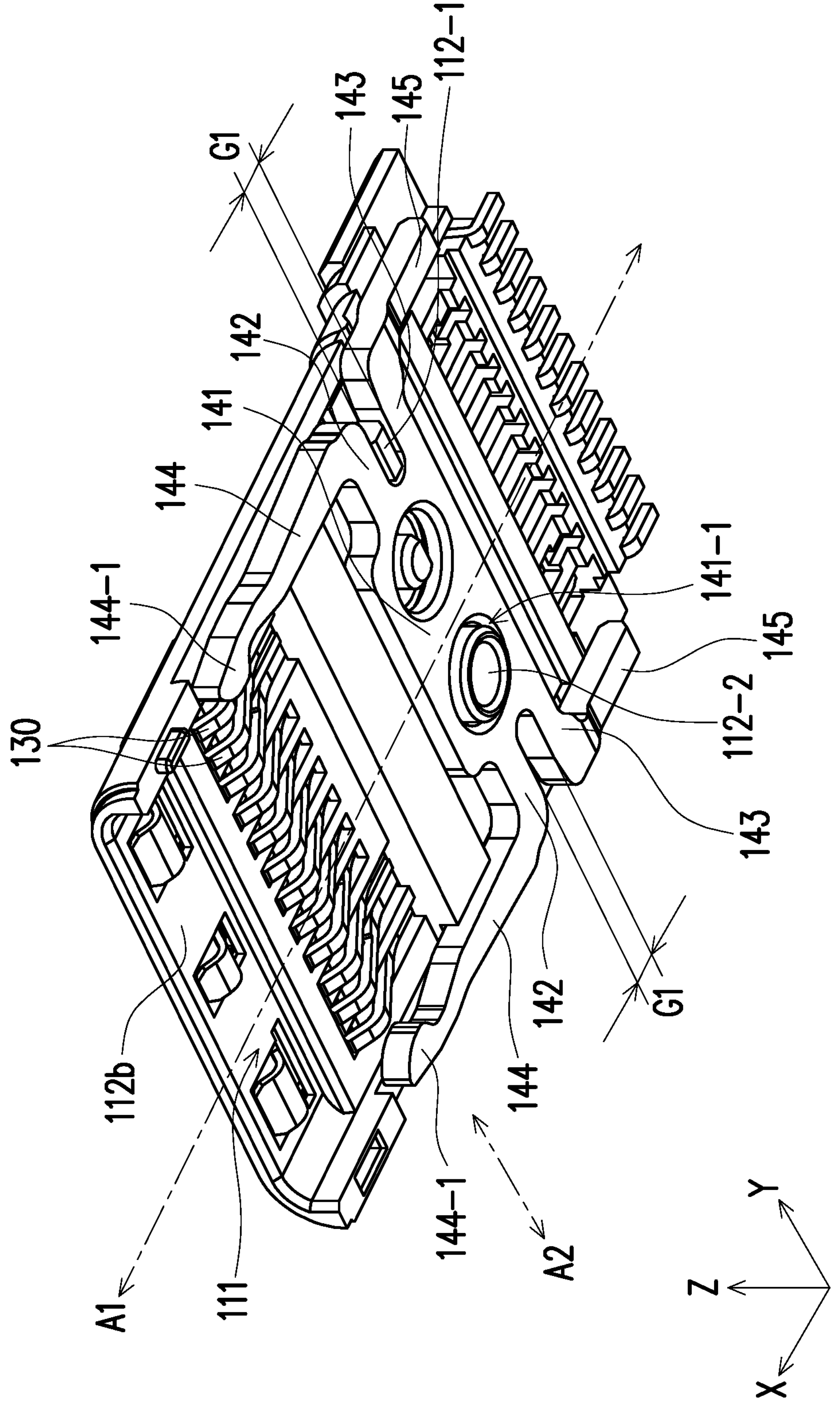

Referring to FIGS. 3 and 4, in this embodiment, the grounding piece 140 includes a fixed portion 141, two first connecting portions 142, two second connecting portions 143, two clamp arms 144, and two grounding legs 145. The two first connecting portions 142 respectively extend from two opposite sides of the fixed portion 141 along the Y axis and face gradually away from the fixed portion 141, and the two clamp arms 144 respectively extend from the two first connecting portions 142 along the X axis. The two second connecting portions 143 respectively extend from two opposite sides of the fixed portion 141 along the Y axis and face gradually away from the fixed portion 141, and the two grounding legs 145 respectively extend from the two second connecting portions 143 along the X axis.

It should be noted that the extending directions of the two first connecting portions 142 and the extending directions of the two second connecting portions 143 are parallel to the alignment axis A2. The extending direction of the two clamp arms 144 is opposite to the extending direction of the two grounding legs 145, in which the extending directions of the two clamp arms 144 and the two grounding legs 145 are parallel to the insertion axis A1. The above-mentioned restriction features of the extending directions allow these components to be better combined, which facilitates the assembly and is therefore suitable for mass production.

Therefore, in this embodiment, the fixed portion 141, the two first connecting portions 142, and the two clamp arms 144 are connected to each other to form a U-shaped structure, in which the opening 146 of the U-shaped structure faces the insertion space 111. The fixed portion 141, the two second connecting portions 143, and the two grounding legs 145 are connected to each other to form an inverted U-shaped structure, in which and the opening 147 of the inverted U-shaped structure faces away from the insertion space 111.

Specifically, referring to FIG. 3 and FIG. 4, in this embodiment, along the alignment axis A2, the plurality of terminals 130 are located between the two clamp arms 144 and in the opening 146 of the U-shaped structure. Each end of the two clamp arms 144 opposite to the fixed portion 141 has a clamp head 144-1 for clamping the other electrical connector.

When the other electrical connector is inserted into the insertion space 111 of the electrical connector 100 along the insertion axis A1, the terminals 130 are connected with the other electrical connector, and the clamp head 144-1 of the grounding piece 140 is adapted to clamp the other electrical connector, so as to firmly fix the other electrical connector in the insertion space 111 of the inner shell 112.

It is worth mentioning that, for the structure of the grounding piece 140 of this embodiment, since the extending direction of each of the first connecting portions 142 (parallel to the alignment axis A2) is different from the extending direction of the clamp arms 144 which are connected to the first connecting portion 142 (parallel to the insertion axis A1), and the extending direction of each of the second connecting portions 143 (parallel to the alignment axis A2) is different from the extending direction of the grounding legs 145 which are connected to the second connecting portion 143 (parallel to the insertion axis A1), the length of the grounding piece 140 along the insertion axis A1 can be shortened without affecting the clamping force of the grounding piece 140 for the other electrical connector.

Compared with conventional electrical connectors in which the arm portion of the grounding piece is in a straight line along the X axis (that is to say, the arm portion only extends along the insertion axis A1 and cannot be shortened in length, thereby affecting the high-frequency characteristics of the electrical connectors), the electrical connector 100 of this embodiment effectively reduces the length of the overall structure along the insertion axis A1 through the structural design of the grounding piece 140 (that is to say, by changing the clamp arm 144 and the first connecting portion 142 into an L shape), leaving only the length of the clamp arm 144 along the X axis. Such arrangement is equivalent to controlling the length of the electrical connector 100 along the insertion axis A1, so that the electrical connector 100 has excellent high-frequency characteristics.

The structural relationship between the inner shell 112 and the grounding piece 140 is further described below.

Referring to FIG. 3 and FIG. 4 at the same time, in this embodiment, the two inner shell components 112*a* and 112*b* of the inner shell 112 include two first positioning protrusions 112-1. There are two distances G1 corresponding to the two first positioning protrusions 112-1 between the two first connecting portions 142 and the two second connecting portions 143 along the insertion axis A1, and the two distances G1 are located on two opposite sides of the fixed portion 141 along the alignment axis A2. In fact, the inner shell components 112*a* and 112*b* of the embodiment, each of which has one first positioning protrusion 112-1, are in complementary structural relationship with each other in the assembly process, as shown in FIG. 2, which is equivalent to the fact that the structural features of the inner shell components 112*a* and 112*b* are the same as each other. Therefore, only one set of molds is required to complete the inner shell components 112*a* and 112*b*, which is beneficial to simplifying the manufacturing process and reducing the manufacturing cost.

When the grounding piece 140 is assembled and clamped between the two inner shell components 112*a* and 112*b* of the inner shell 112, the two first positioning protrusions 112-1 respectively protrude into the two distances G1, to clamp the two first connecting portions 142 and the two second connecting portions 143 along the insertion axis A1 and clamp two opposite sides of the fixed portion 141 along the alignment axis A2.

That is, in this embodiment, when the grounding piece 140 is assembled and clamped between the two inner shell components 112*a* and 112*b* of the inner shell 112, the two first positioning protrusions 112-1 are located between the two first connecting portions 142 and the two second connecting portions 143 along the insertion axis A1, and the fixed portion 141 is located between the two first positioning protrusions 112-1 along the alignment axis A2, so as to limit the movement of the grounding piece 140 along the insertion axis A1 and the alignment axis A2.

In addition, in another embodiment not illustrated herein, the above-mentioned two first positioning protrusions 112-1 can also be both provided on the same inner shell component 112*a* or on the same inner shell component 112*b*, which also achieves the clamping effect as mentioned above.

Figure 5:
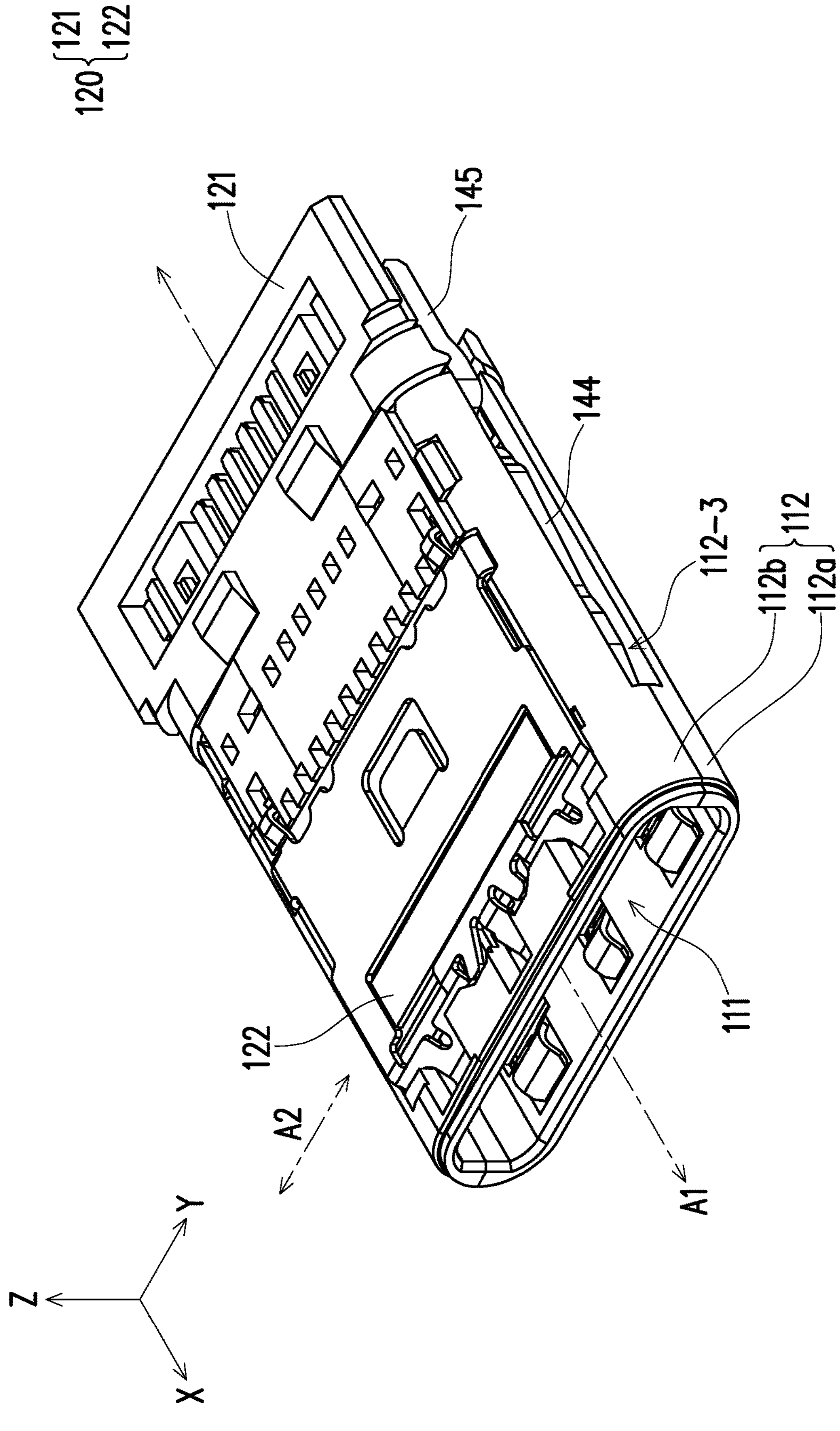
Figure 6:
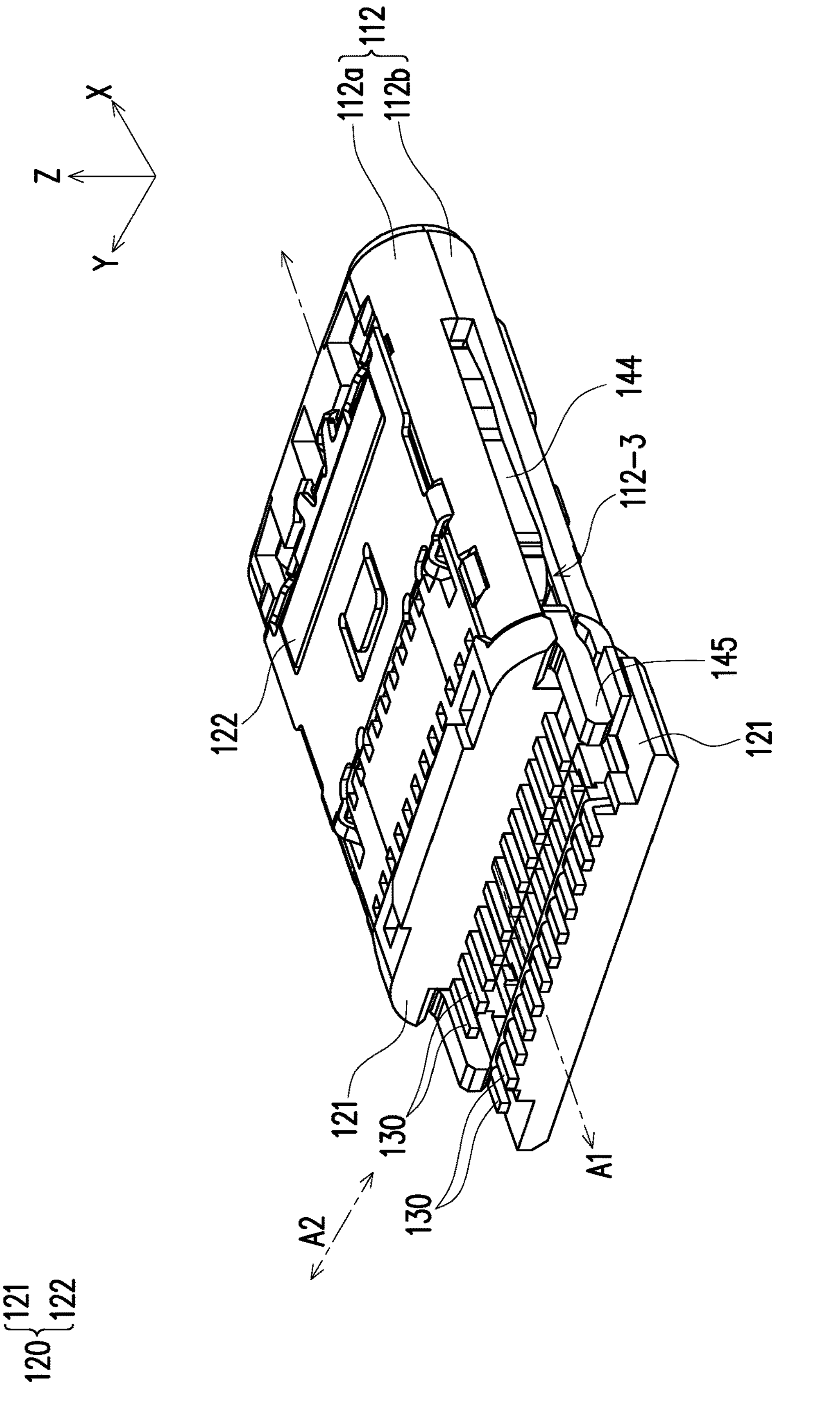

Referring to FIGS. 3 and 4, in this embodiment, the two inner shell components 112*a* and 112*b* of the inner shell 112 further include two second positioning protrusions 112-2 protruding from the insertion space 111, and the two second positioning protrusions 112-2 are located between the two first positioning protrusions 112-1. The fixed portion 141 has two fixed holes 141-1 corresponding to the two second positioning protrusions 112-2, so that the fixed portion 141 is fixated on the two second positioning protrusions 112-2 of the inner shell 112 through the two fixed holes 141-1, thereby restricting the movement of the grounding piece 140 along the insertion axis A1 and the alignment axis A2. Just as the aforementioned inner shell components 112*a* and 112*b* have the same structural features as their counterparts, the second positioning protrusions 112-2 as illustrated are composed of a hollow column (connected with the reference numeral in the figure) and a solid column (connected with no reference numeral in the figure) as is shown in the figure, so the two solid columns are inserted into the hollow columns of the counterpart to complete the assembly. Referring to FIG. 5 and FIG. 6 at the same time, in this embodiment, the inner shell 112 has two symmetrical accommodating notches 112-3 along the alignment axis A2. The two clamp arms 144 are respectively located in the two accommodating notches 112-3 of the inner shell 112, and the terminals 130 (FIG. 3, FIG. 4) are located between the two clamp arms 144 along the alignment axis A2.

Specifically, the insertion space 111 is located between the two accommodating notches 112-3 along the alignment axis A2. The two clamp arms 144 respectively extend into the insertion space 111 of the inner shell 112 from the two accommodating notches 112-3 to connect with the other electrical connector and securely clamp the other electrical connector in the insertion space 111 of the inner shell 112.

In addition, referring to FIG. 6, in this embodiment, on one side relative to the insertion space 111 of the inner shell 112, the joint surfaces of the terminals 130 combined with the two first components 121 are coplanar with the grounding legs 145, and the joint surfaces of the terminals 130 and the grounding legs 145 can be bonded to a circuit board (not shown) by means of Surface Mount Technology (SMT), but not limited thereto.

Based on the above, in the electrical connector of the disclosure, by means of the structural design of the grounding piece, the length of the grounding piece along the insertion axis is shortened without affecting the clamping force of the grounding piece for another electrical connector (not shown), thereby controlling the length of the electrical connector along the insertion axis. Accordingly, compared with conventional electrical connectors in which the length of the electrical connector along the insertion axis is increased due to the structure of the grounding piece, which affects the high-frequency characteristics of the electrical connector, the electrical connector of the disclosure has excellent high-frequency characteristics.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electrical connector, comprising:

a shell having an insertion space and comprising an inner shell and an outer shell, wherein the inner shell comprises two inner shell components, and another electrical connector is adapted to be inserted into the insertion space along an insertion axis;

two insulating bodies, respectively disposed on upper and lower external surfaces of the inner shell, sandwiching the inner shell in a vertical arrangement;

a plurality of terminals arranged on the two insulating bodies along an alignment axis; and a grounding piece, sandwiched between the two inner shell components, wherein the grounding piece includes a fixed portion, two first connecting portions, two second connecting portions, two clamp arms, and two grounding legs, wherein the two first connecting portions respectively extend from the fixed portion and extending directions of the two first connecting portions are opposite to each other, and the two second connecting portions respectively extend from the fixed portion and extending directions of the two second connecting portions are opposite to each other, wherein the two clamp arms respectively extend from the two first connecting portions towards the insertion space, the two grounding legs respectively extend from the two second connecting portions, and an extending direction of each of the two clamp arms is opposite to an extending direction of each of the two grounding legs, wherein the first connecting portion and the second connecting portion located on a same side of the fixed portion are separated from each other by a gap therebetween, such that a distance is maintained between each of the two first connecting portions and each of the two second connecting portions along the insertion axis.

2. The electrical connector according to claim 1, wherein along the alignment axis, the plurality of terminals are located between the two clamp arms, and the two clamp arms respectively have clamp heads to clamp the another electrical connector.

3. The electrical connector according to claim 1, wherein the fixed portion, the two first connecting portions, and the two clamp arms are connected to one another to form a U-shaped structure, and an opening of the U-shaped structure faces the insertion space.

4. The electrical connector according to claim 1, wherein the fixed portion, the two second connecting portions, and the two grounding legs are connected to one another to form an inverted U-shaped structure, and an opening of the inverted U-shaped structure faces away from the insertion space.

5. The electrical connector according to claim 1, wherein the inner shell has the insertion space and covers the grounding piece, the outer shell covers the inner shell, the two insulating bodies, and the plurality of terminals, the inner shell has two first positioning protrusions, and each of the two first positioning protrusions protrudes into the distance to clamp each of the two first connecting portions and each of the two second connecting portions along the insertion axis.

6. The electrical connector according to claim 5, wherein the inner shell comprises the two inner shell components to form a closed annular structure and forms the insertion space, the grounding piece is assembled between the two inner shell components, and the two grounding legs extend out of the inner shell, and the two first positioning protrusions are located in at least one of the two inner shell components.

7. The electrical connector according to claim 6, wherein the two inner shell components further form two accommodating notches located on the alignment axis, and the two clamp arms respectively extend into the insertion space from the two accommodating notches.

8. The electrical connector according to claim 6, wherein the inner shell further has two second positioning protrusions located in at least one of the two inner shell components, the fixed portion has two fixed holes corresponding to the two second positioning protrusions, and the fixed portion of the grounding piece is assembled on the two second positioning protrusions through the two fixed holes and positioned between the two inner shell components.

9. The electrical connector according to claim 8, wherein the two second positioning protrusions are located between the two first positioning protrusions along the alignment axis.

10. An electrical connector, comprising:

a shell having an insertion space and comprising an insulative housing and a metallic shell, wherein another electrical connector is adapted to be inserted into the insertion space along an insertion axis;

two terminal modules, respectively arranged on both sides of the insulative housing; and a grounding piece located inside the insulative housing, wherein the grounding piece includes a fixed portion, two first connecting portions, two second connecting portions, two clamp arms, and two grounding legs, wherein the two first connecting portions respectively extend from the fixed portion and extending directions of the two first connecting portions are opposite to each other, and the two second connecting portions respectively extend from the fixed portion and extending directions of the two second connecting portions are opposite to each other, wherein the two clamp arms respectively extend from the two first connecting portions towards the insertion space, the two grounding legs respectively extend from the two second connecting portions, and an extending direction of each of the two clamp arms is opposite to an extending direction of each of the two grounding legs, wherein the first connecting portion and the second connecting portion located on a same side of the fixed portion are separated from each other by a gap therebetween, such that a distance is maintained between each of the two first connecting portions and each of the two second connecting portions along the insertion axis.

11. The electrical connector according to claim 10, wherein the insulative housing comprises two insulative housing components to form a closed annular structure and forms the insertion space and the grounding piece is sandwiched between the two insulative housing components.

12. The electrical connector according to claim 11, wherein the two insulative housing components are symmetrically arranged relative to the insertion axis.

13. The electrical connector according to claim 10, wherein each of the two terminal modules comprises an insulating body and a plurality of terminals arranged on the insulating body along an alignment axis, wherein the insulating body is arranged on the insulative housing.

14. The electrical connector according to claim 13, wherein along the alignment axis, the plurality of terminals are located between the two clamp arms, and the two clamp arms respectively have clamp heads to clamp the another electrical connector.

15. The electrical connector according to claim 10, wherein the fixed portion, the two first connecting portions, and the two clamp arms are connected to one another to form a U-shaped structure, and an opening of the U-shaped structure faces the insertion space.

16. The electrical connector according to claim 10, wherein the fixed portion, the two second connecting portions, and the two grounding legs are connected to one another to form an inverted U-shaped structure, and an opening of the inverted U-shaped structure faces away from the insertion space.

17. The electrical connector according to claim 10, wherein a distance is maintained between each of the two first connecting portions and each of the two second connecting portions along the insertion axis.

* * * * *